(12) United States Patent
Goldis et al.

(10) Patent No.: US 12,271,042 B2
(45) Date of Patent: Apr. 8, 2025

(54) FAST-AXIS COLLIMATOR WITH HANGING CONNECTOR

(71) Applicant: Apple Inc., Cupertino, CA (US)

(72) Inventors: Alexander Goldis, San Francisco, CA (US); Jeffrey T. Hill, Los Altos, CA (US); Michael J. Bishop, Waterloo (CA)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/634,911

(22) Filed: Apr. 13, 2024

(65) Prior Publication Data
US 2024/0272380 A1    Aug. 15, 2024

Related U.S. Application Data

(63) Continuation of application No. 17/508,760, filed on Oct. 22, 2021, now Pat. No. 11,960,128.
(Continued)

(51) Int. Cl.
*G02B 6/42* (2006.01)
*G02B 6/30* (2006.01)
*G02B 19/00* (2006.01)

(52) U.S. Cl.
CPC ......... *G02B 6/4204* (2013.01); *G02B 6/4206* (2013.01); *G02B 6/4219* (2013.01); *G02B 6/4244* (2013.01); *G02B 6/4296* (2013.01); *G02B 19/0057* (2013.01); *G02B 6/30* (2013.01); *G02B 6/4262* (2013.01)

(58) Field of Classification Search
CPC .. G02B 6/4204; G02B 6/4206; G02B 6/4244; G02B 6/425; G02B 6/4239; G02B 6/12004
See application file for complete search history.

(56) References Cited

U.S. PATENT DOCUMENTS

| 5,135,605 A | 8/1992 | Blonder |
| 5,182,787 A | 1/1993 | Blonder |

(Continued)

FOREIGN PATENT DOCUMENTS

| EP | 1237019 | 9/2002 |
| JP | 2002328245 | 11/2002 |

(Continued)

OTHER PUBLICATIONS

U.S. Appl. No. 17/949,096, filed Sep. 20, 2022, Tu et al.
(Continued)

*Primary Examiner* — Michelle R Connelly
(74) *Attorney, Agent, or Firm* — Brownstein Hyatt Farber Schreck, LLP (57) ABSTRACT

A photonics package may include a substrate, a hanging connector, and a fast-axis collimator ("FAC"). The hanging connector is typically affixed to a side of the substrate other than the side through which a light output is emitted. The hanging connector may be L-shaped in cross-section, having a base section and an extended section projecting from the base section. The base section affixes to the substrate while the extended section affixes to the FAC, so that the FAC extends downward along the emitter surface of the substrate; a vertex of the FAC is coplanar with an emitter outputting the light output.

20 Claims, 11 Drawing Sheets

Related U.S. Application Data (60) Provisional application No. 63/104,687, filed on Oct. 23, 2020.

(56) References Cited

U.S. PATENT DOCUMENTS

| | | | |
|---|---|---|---|
| 5,420,722 A * | 5/1995 | Bielak | G02B 6/4204 359/708 |
| 6,112,005 A | 8/2000 | Liu | |
| 6,393,185 B1 | 5/2002 | Deacon et al. | |
| 6,985,506 B2 | 1/2006 | Lissotschenko | |
| 6,987,906 B2 | 1/2006 | Nakama et al. | |
| 7,250,317 B2 | 7/2007 | Heideman | |
| 7,995,875 B2 | 8/2011 | Yasuda et al. | |
| 8,041,159 B2 | 10/2011 | Yanagisawa | |
| 8,236,481 B2 | 8/2012 | Nottola et al. | |
| 8,363,995 B2 | 1/2013 | Gothoskar et al. | |
| 8,774,575 B2 | 7/2014 | Fujiwara et al. | |
| 8,855,155 B2 | 10/2014 | Lutgen et al. | |
| 9,025,926 B2 | 5/2015 | Chang et al. | |
| 9,182,544 B2 | 11/2015 | Kobrinsky et al. | |
| 9,229,169 B2 | 1/2016 | Doany et al. | |
| 9,229,179 B2 | 1/2016 | Ishibashi | |
| 9,285,555 B2 | 3/2016 | Yabre | |
| 9,377,594 B2 | 6/2016 | Liff et al. | |
| 9,411,105 B2 | 8/2016 | Anderson et al. | |
| 9,470,864 B1 | 10/2016 | Yo | |
| 9,507,086 B2 | 11/2016 | Kobrinsky et al. | |
| 9,568,679 B2 | 2/2017 | Doany et al. | |
| 9,696,486 B2 | 7/2017 | Zheng | |
| 9,705,289 B2 | 7/2017 | Kanskar et al. | |
| 9,829,631 B2 | 11/2017 | Lambert | |
| 10,018,781 B1 | 7/2018 | Masuda | |
| 10,025,044 B1 | 7/2018 | Masuda | |
| 10,209,452 B1 * | 2/2019 | Hung | G02B 6/30 |
| 10,261,389 B2 | 4/2019 | Skirlo et al. | |
| 10,379,293 B2 | 8/2019 | Nakazuru et al. | |
| 10,429,597 B2 | 10/2019 | ten Have et al. | |
| 10,539,752 B2 | 1/2020 | Masuda | |
| 10,558,003 B2 | 2/2020 | Ootorii | |
| 10,613,282 B2 | 4/2020 | Cyr | |
| 10,634,843 B2 | 4/2020 | Bayn et al. | |
| 10,650,110 B2 | 5/2020 | Van Vaerenbergh et al. | |
| 10,725,242 B2 | 7/2020 | Beausoleil et al. | |
| 10,788,632 B2 | 9/2020 | Wang | |
| 10,823,912 B1 | 11/2020 | Pelc et al. | |
| 10,931,080 B2 | 2/2021 | Karplus | |
| 11,143,820 B2 | 10/2021 | Tsunoda | |
| 11,525,958 B1 | 12/2022 | Pelc et al. | |
| 11,644,618 B2 | 5/2023 | Bishop et al. | |
| 2004/0258124 A1 * | 12/2004 | Lissotschenko | H01S 5/4025 372/75 |
| 2014/0086527 A1 | 3/2014 | Ban et al. | |
| 2017/0003453 A1 * | 1/2017 | Doany | G02B 6/30 |
| 2020/0084050 A1 | 3/2020 | Mensch et al. | |
| 2022/0128782 A1 | 4/2022 | Goldis | |
| 2023/0087293 A1 | 3/2023 | Witmer et al. | |
| 2023/0089758 A1 | 3/2023 | Tu et al. | |
| 2023/0251420 A1 | 8/2023 | Bishop et al. | |
| 2024/0094466 A1 | 3/2024 | Arbore et al. | |

FOREIGN PATENT DOCUMENTS

| | | |
|---|---|---|
| JP | 2008089879 | 4/2008 |
| JP | 2008262116 | 10/2008 |
| JP | 6384152 | 9/2018 |
| WO | WO 05/091036 | 9/2005 |

OTHER PUBLICATIONS

He et al., "Integrated Polarization Compensator for WDM Waveguide Demultiplexers," *IEEE Photonics Technology Letters* vol. 11, No. 2, Feb. 1999, pp. 224-226.

Sauer et al., "Individualized FAC on Bottom Tab subassemblies to minimize adhesive gap between emitter and optics," *High-Power Diode Laser Technology XV*, edited by Mark S. Zediker, Proceeding of SPIE, vol. 10086, 2017, 8 pages.

Suematsu et al., "Fundamental Transverse Electric Field (TEO) Mode Selection for Thin-Film Asymmetric Light Guides," *Applied Physics Letters*, American Institute of Physics, Melville, New York, vol. 21, No. 6, 1972, pp. 291-293.

* cited by examiner

FAST-AXIS COLLIMATOR WITH HANGING CONNECTOR

CROSS-REFERENCE TO RELATED APPLICATION

This application is a continuation of U.S. patent application Ser. No. 17/508,760, filed Oct. 22, 2021, which is a nonprovisional and claims the benefit under 35 U.S.C. § 119(e) of U.S. Provisional Patent Application No. 63/104,687, filed Oct. 23, 2020, the contents of which are incorporated herein by reference as if fully disclosed herein.

FIELD

Embodiments described herein relate generally to photonics packages, and more particularly to photonics integrated chips connected to a fast axis collimator by a hanging connector.

BACKGROUND

Fast-axis collimators are typically used to collimate light received from a laser diode or other light source. These collimators are often attached or adjacent to an emitter of a photonics integrated chip ("PIC") in order to receive and collimate light from the emitter.

A fast-axis collimator may be affixed to, or adjacent to, an emitter in a number of ways. Fast-axis collimators may be affixed directly to the emitter or may be attached to a tab that is, in turn, bonded to a substrate of the photonics integrated chip. The tab is bonded to the same side of the substrate from which light is emitted by the emitter. Thus, the tab typically is positioned below the fast-axis collimator in order to align the collimator with the emitter. Put another way, the surface of the tab that is bonded to the substrate and the edge of the fast-axis collimator that accepts light from the emitter face the same side of the substrate (or other portion of the PIC).

In order to properly align the fast-axis collimator and the emitter, the fast-axis collimator is generally aligned and affixed (or the supporting tab is affixed) while the light source is active. While the fast-axis collimator and emitter may be precisely aligned through active alignment, this alignment process is time-consuming and requires very precise positioning (and changes in position). This, in turn, may slow mass manufacture of photonics packages incorporating a fast-axis collimator.

SUMMARY

One embodiment described herein takes the form of a photonics package, comprising: a substrate comprising: a connector surface; and an emitter surface meeting the connector surface at an edge; a waveguide at least partially within the substrate; an emitter coupled to the waveguide; a hanging connector affixed to the connector surface; and an optical component affixed to the hanging connector; wherein the optical component extends along a portion of the emitter surface.

Another embodiment described herein takes the form of a hanging connector, comprising: a base section; and an extended section connected to the base section; wherein: the base section is configured to be affixed to a connector surface of substrate of a photonics package; the extended section is configured to be affixed to an optical component, such that a vertex of the optical component is coplanar with an emitter of the photonics package that is positioned on an emitter surface of the photonics package.

Still another embodiment described herein takes the form of a method for forming a photonics package, comprising: affixing an optical component to a hanging connector with a first bond; and affixing the hanging connector to a connector surface of a substrate with a second bond, such that the optical component extends along an emitter surface of the substrate; wherein: an emitter on the emitter surface is configured to emit a light output; the optical component is configured to receive the light output; a vertex of the optical component is coplanar with the emitter; and the optical component is configured to collimate the light output.

These and other embodiments will be apparent upon reviewing this document in its entirety, and the foregoing embodiments are examples described more fully herein rather than any form of limitation.

BRIEF DESCRIPTION OF THE DRAWINGS

The disclosure will be readily understood by the following detailed description in conjunction with the accompanying drawings, wherein like reference numerals designate like structural elements, and in which.

Shading and/or hatching is intended to illustrate separate components in cross-sections, or common components in cross-section where the same shading is used. It does not convey or indicate any particular color or material.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

A "photonics package," as that term is used herein, refers to a set of components that are operably coupled together to emit light. Generally, a photonics package includes a light source, a waveguide or other propagation material, and an emitter. The photonics package may include one or more optical components configured to accept and modify light emitted from the light source. Some or all of the components of the photonics package may be part of a photonics integrated chip ("PIC"). For example, the light source, waveguide, and emitter may be part of a PIC although, in some embodiments, one or more of these components may be off-chip.

The "emitter" of the photonics integrated chip may be a separate optical component, such as a lens, outcoupler, grating, or the like, or may simply be a terminus of a waveguide. The emitter may be formed integrally with the waveguide or may be a separate component that is affixed to, or adjacent to, the waveguide. Accordingly, references herein to an emitter should be understood to encompass both an end of a waveguide and a dedicated optical component, as appropriate.

One example of an optical component of a photonics package is a fast-axis collimator ("FAC"). The fast-axis collimator receives a light output from an emitter and collimates it. Fast-axis collimators may be used in photonics packages where the light source is a laser diode, as one non-limiting example, since laser diodes typically emit a diverging light output. In certain embodiments, the light source, waveguide (or other propagation medium), and emitter are part of a PIC to which the FAC is connected. Thus, as light outcouples from the PIC (through the emitter), the FAC collimates the light.

A hanging connector may position the FAC relative to the PIC's emitter. The FAC is typically aligned so that its vertex is coplanar with the emitter. If the FAC's vertex and the emitter are not coplanar then the light output may be insufficiently collimated. Even minor misalignments on the order of several hundred nanometers may cause the FAC to be unable to collimate the light output, or to poorly collimate the light output. This, in turn, may cause the photonics package to operate incorrectly.

The hanging connector is typically affixed to a side of a substrate other than the side through which the light output is emitted (e.g., the side of the substrate on which the emitter is positioned, or the "emitter surface"). That is, if the emitter surface is considered a sidewall of the substrate then the hanging connector is affixed to a top or bottom of the substrate. The foregoing nomenclature is used in this document, such that the substrate surface to which the hanging connector is affixed (the "connector surface") is a "top" of the substrate while the surface through which the light output is emitted (the emitter surface) is a "side" of the substrate. Another way to describe the relationship between the emitter surface and the connector surface is that the two meet at a right angle, presuming the substrate is a rectangular cuboid.

The hanging connector may be L-shaped in cross-section, defining a stepped cross-section profile. The hanging connector may include a thicker, base section and a thinner, extended section that projects from the base section. The base section affixes to the substrate while the extended section affixes to the FAC, so that the FAC extends downward along the emitter surface of the substrate.

Generally, the FAC is affixed to the hanging connector, which is in turn affixed to the top of the substrate. The FAC extends along a portion of the emitter surface from the hanging connector, so that the FAC is adjacent the emitter and the FAC's vertex is substantially coplanar with the emitter. "Substantially coplanar" means that the FAC's vertex and the emitter are not out-of-plane by more than the manufacturing tolerance of the substrate, plus the manufacturing tolerance of the hanging connector, plus any manufacturing tolerance of the fast-axis collimator. Generally, these manufacturing tolerances are less than five microns and may be as little as two microns.

By affixing the hanging connector to a top of the substrate, the dimensions and structure of the hanging connector itself may be used to properly align the FAC with respect to the emitter. For any of a group of mass-produced photonics packages, the distance of the emitter from the edge where the emitter surface and connector surface meet (the "emitter edge") is constant, within manufacturing tolerances of the substrate. Likewise, the height of the hanging connector is constant, again within manufacturing tolerances of the connector. Accordingly, any misalignment of the FAC with respect to the emitter is governed by these two manufacturing tolerances insofar as variances in size of the FAC are extremely minor in comparison. Thus, the vertex of the FAC will never be offset from the emitter by more than the sum of the maximum manufacturing tolerances for the substrate and hanging connector. As mentioned above, this is typically less than five microns, which is small enough that the FAC may collimate substantially all of the light output from the emitter.

Further, because the FAC's vertex is always substantially aligned with the emitter by the hanging connector, there is no need to actively align the FAC with the emitter. Thus, the hanging connector may be affixed to the substrate without powering on the photonics package. This substantially accelerates photonics package manufacture, leads to fewer defects when mass producing photonics packages, and reduces manufacturing cost.

Embodiments are described as employing a FAC, and particularly are discussed with respect to a FAC affixed to a hanging connector. However, it should be understood that many different optical components may be affixed to, and positioned relative to other parts of a photonics package by, a hanging connector. The hanging connector may be affixed to a slow axis collimator, aspheric or spherical lens, microlens array, turning mirror, or any other suitable optical component. Accordingly, discussions herein regarding the use of a hanging connector with a FAC should be understood to encompass the use of a hanging connector with any other suitable optical component.

These and other embodiments are discussed below with reference to FIGS. 1-6. However, those skilled in the art will readily appreciate that the detailed description given herein with respect to these Figures is for explanatory purposes only and should not be construed as limiting.

Figure 1:
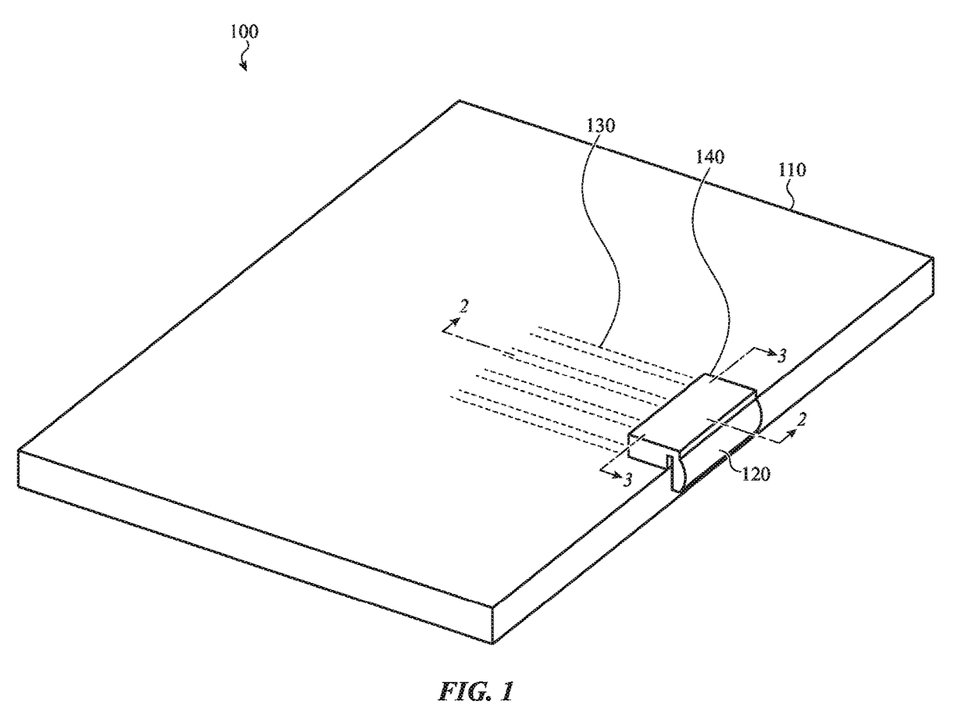
FIG. 1 illustrates a sample photonics package incorporating a fast-axis collimator and a hanging connector.

FIG. 1 illustrates a photonics package 100, including a photonics integrated chip 110, a fast-axis collimator 120, a waveguide 130, and a hanging connector 140. The photonics package typically includes one or more light sources (not shown) operative to emit a light output; each light source may be operably connected to a waveguide such that the light output propagates through the waveguide 130. Each waveguide 130 may be connected to an emitter (not shown in FIG. 1, but visible in FIG. 2) that outcouples the light output from the PIC 110 to the FAC 120 where the light output is collimated. In some embodiments, the light sources are laser diodes, although other embodiments may use other types of light sources.

The waveguides 130 may be fully or partially within the PIC 110. In some embodiments, a surface of the waveguide 130 is coplanar with a surface of the PIC 110 (such as its connector surface) and so the waveguide is partially within the PIC. In other embodiments, the waveguide 130 may be fully within the PIC 110 except for its terminus at the emitter, as shown. In either embodiment, they optically couple the light source(s) to the emitter.

The FAC 120 is configured to receive light from the emitter and may be separated from the emitter by an offset 260. The FAC 120 collimates the light output received from the emitter as the light output passes through the FAC. The light output may propagate from the FAC 120, through free space, and to another component of the photonics package 100, such as optical components or the like. The surface of the fast-axis collimator closest to the emitter is generally parallel to the emitter surface, so the offset is substantially constant.

The hanging connector 140 is affixed to the PIC 110, which is a substrate for the hanging connector in this embodiment. Specifically, the hanging connector 140 is affixed to a connector surface of the PIC 110 and is also affixed to the FAC 120. The hanging connector 140 is positioned so that the FAC 120 extends along (and is parallel to) a portion of the emitter surface of the PIC 110. It should be appreciated that the term "top side" is relative and given with respect to the orientation of the PIC 110 shown in FIG. 1.

Figure 2:
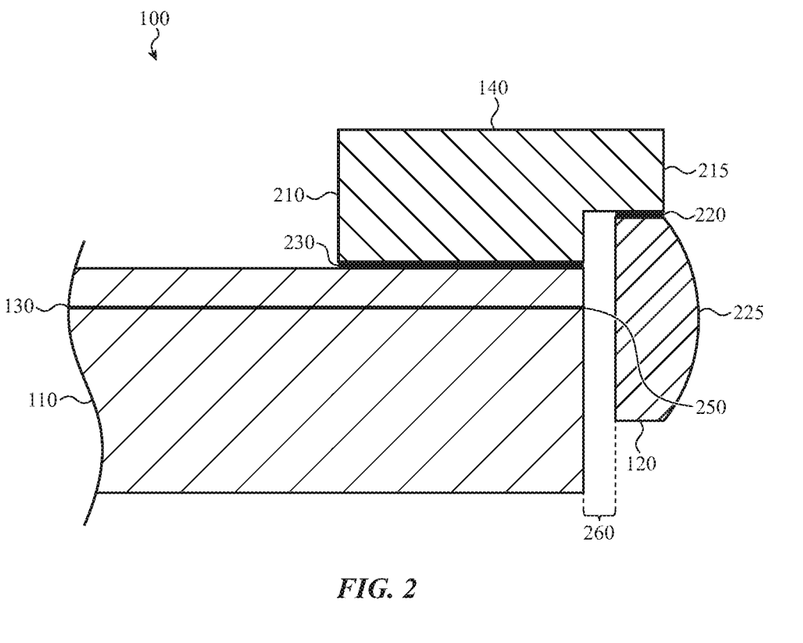
FIG. 2 is a cross-sectional view of a portion of a photonics package, taken along line 2-2 of FIG. 1, showing an example hanging connector.

The FAC 120 extends sufficiently far along the emitter surface of the PIC 110 that the vertex 225 of the FAC (or other optical component) is coplanar with the emitter 250, as shown in FIG. 2. FIG. 2 is a cross-sectional view of the PIC 110, hanging connector 140, and FAC 120 taken along line 2-2 of FIG. 1. Generally, the hanging connector 140 is affixed to the FAC 120 by a first bond 220 and to the PIC 110 by a second bond 230. The first and second bonds 220, 230 are discussed in more detail below with respect to FIGS. 3A-3C.

The FAC 120 acts as an aspheric lens and is flat on a side facing the emitter 250 and convex on its opposing side. The FAC 120 (or other optical component) is separated from the emitter 250 by an offset 260. The size of the offset varies between embodiments (although it is generally constant within an embodiment), but is typically in the tens of microns. Pick and place operations may place the hanging connector 140 on the PIC 110 at a designated point; variances in such pick and place operations may cause the size of the offset to be up to five microns larger or smaller, and in some embodiments as little as one micron larger or smaller. Generally, the closer the size of the offset is to its design size, the tighter or narrower the collimated beam outputted by the FAC 120.

As shown in FIG. 2, the hanging connector 140 is L-shaped in cross-section. The hanging connector includes a base section 210 and an extended section 215; the extended section is stepped down in cross section from the base section and projects from the base section toward the emitter surface. Thus, although one surface of the base section and extended section is common or coplanar, opposing surfaces of the base section 210 and extended section 215 are separated by a sidewall. This creates the stair-step cross-section shown in FIG. 2.

The base section 210 is affixed to the PIC 110 by the second bond 220. Likewise, the extended section 215 is affixed to the FAC 120 (or other optical component) by the first bond 220. Since the vertex 225 of the FAC 120 is aligned with the emitter 250 and the emitter is generally near or at the connector surface of the PIC 110, the extended section 215 is cross-sectionally thinner than the base section 210 from which it projects, in order to facilitate this alignment. Further, although the base section 210 is shown in FIG. 2 as extending to the emitter edge, this is not necessary. The base section 210 may be recessed from the emitter edge or may extend past the emitter edge, in various embodiments.

FIGS. 3A-3D illustrate different examples of bonds 230 between the hanging connector 140 and the substrate 110 (here, a PIC, although other embodiments may use other substrates), each taken along line 3-3 of FIG. 1. In particular, each of FIGS. 3A-3D illustrate example bonds between the base section 210 of the hanging connector 140 and the substrate 110, although these examples are equally applicable to the bond 220 between the FAC 120 and the extended section 215. Accordingly, the following discussion should be understood to apply to that bond 220, as well, with any discussion of the substrate 110 applying to the FAC 120 and discussion of the base section 210 applying to the extended section 215. Additionally, the waveguides 130 are omitted from the views of FIGS. 3A-3D for simplicity.

Figure 3A:
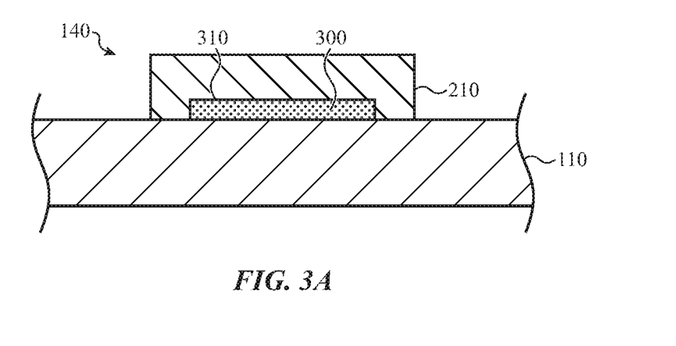
FIGS. 3A-3D are cross-sectional views taken along line 3-3 of FIG. 1, illustrating sample bonds between a hanging connector and a substrate of a photonics package.

As shown in FIG. 3A, an underside of the hanging connector 140 may define a recess 310 that is filled with an adhesive 300. The adhesive may form the bond 230 shown in FIG. 2, securing the hanging connector 140 to the substrate 110. The size and shape of the recess 310 may vary between embodiments. Generally, the recess 310 is sized so that the adhesive 300 does not exit the recess, including during curing or setting. In some embodiments, the adhesive is a heat-activated film.

Figure 3B:
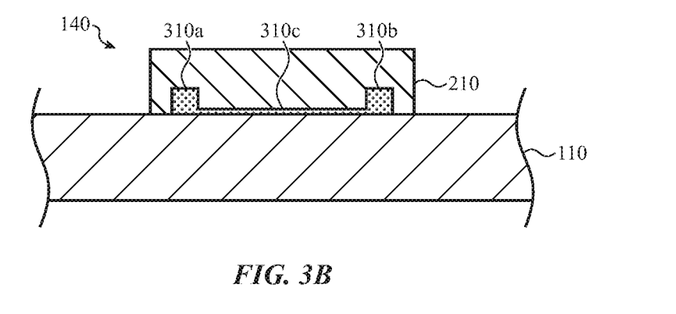

FIG. 3B illustrates a multi-part recess formed from first and second overflow chambers 310a, 310b and a center channel 310c. As with the embodiment shown in FIG. 3A, an adhesive 300 may fill (or substantially fill) the center channel 310c. As the adhesive sets or cures, it may expand or travel into one or both of the overflow chambers 310a, 310b in order to prevent the adhesive from leaking beyond the center channel 310c, or from dislodging the base section 210 of the hanging connector 140.

Figure 3C:
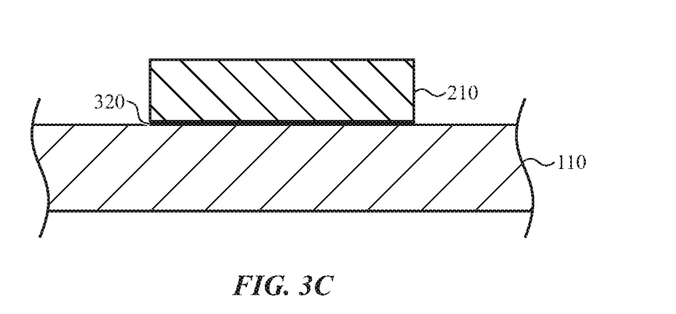
Figure 3D:
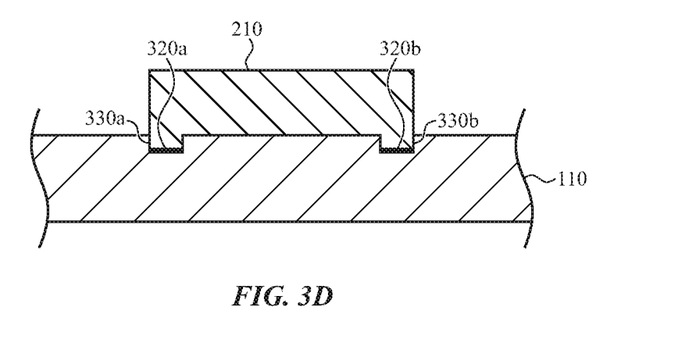

Certain embodiments may forego adhesive when bonding the hanging connector 140 to the substrate 110. For example and as shown in FIG. 3C, a eutectic bond 320 may affix the base section 210 directly to the substrate 110. As another option and as shown in FIG. 3D, one or more holes, depressions, or other recesses 330a, 330b may be formed in the substrate 110. The base section 210 may include or form protrusions, such as legs, configured to be received in the substrate recesses 330a, 330b. Eutectic bonds 320a, 320b may be formed to hold the hanging connector's 140 protrusions to the portion of the substrate exposed by the recesses 330a, 330b, as shown in FIG. 3D. Additionally, during an assembly operation in which the hanging connector 140 is placed on the substrate 110, the recesses 330a, 330b may function as fiducials to align the hanging connector with respect to the substrate. In some embodiments, the recesses 330a, 330b may expose an inner layer of the substrate 110; this inner layer may be metalized or otherwise formed from a material suitable for eutectic bonding to the base section 210 of the hanging connector 140.

As mentioned above, any or all of the bonds discussed with respect to FIGS. 3A-3D may be used to affix the FAC 120 to the hanging connector 140, including the use of a eutectic bond. Eutectic bonds may be particularly suitable for certain embodiments insofar as they are relatively thin and highly controllable, and thus have relatively little dimensional variance between different photonics packages. Thus, where these photonics packages are mass-produced, eutectic bonds may introduce less opportunity for misalignment or dimensional offset between components such as the FAC 120 and hanging connector 140, or the hanging connector and the substrate 110, and so ultimately less misalignment between the FAC and the emitter. Additionally, the eutectic bond (or the use of a thermally conductive epoxy) may ensure that a temperature of the hanging connector 140 and/or FAC 120 (or other optical element or component attached to the hanging connector) are at approximately the same temperature as the substrate 110, thereby reducing any movement, shift, cracking, or misalignment due to thermal differences between components.

Figure 4A:
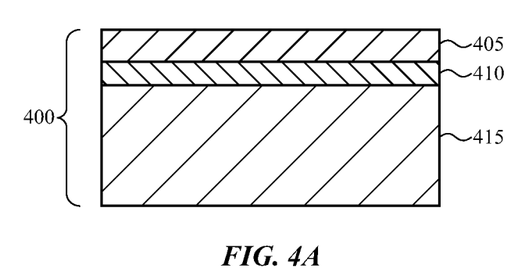
FIGS. 4A-4C illustrate sample operations used to form an example hanging connector.
Figure 4B:
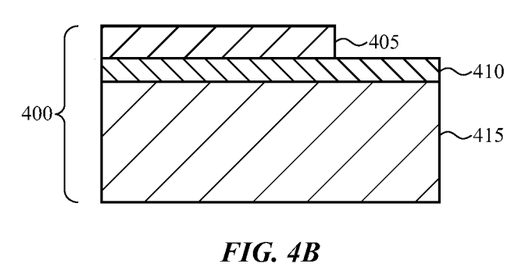
Figure 4C:
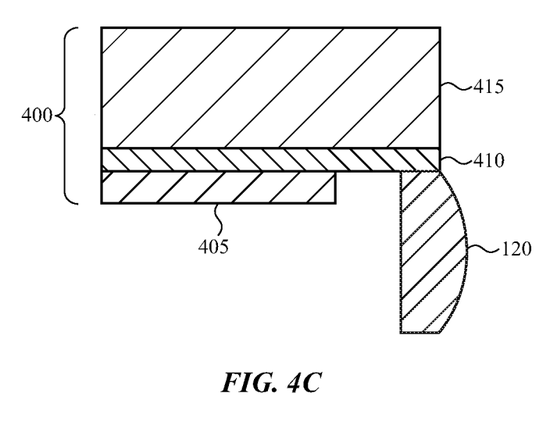

FIGS. 4A-4C show a sample stackup 400 that ultimately forms one example of a hanging connector 140, at various processing stages. Initially and as seen in FIG. 4A, the stackup 400 includes multiple layers. In this embodiment, the stackup 400 includes three layers, namely a silicon substrate or base layer 415, a buried oxide (BOX) layer 410 abutting the base layer 405, and a silicon-on-insulator (SOI) layer 405 abutting the BOX layer 410. Thus, as shown, the BOX layer 410 is sandwiched between, and separates, the base layer 415 and the SOI layer 405. The thicknesses of the layers 405, 410, 415 may vary in different embodiments; in some embodiments the entire stackup may be relatively thin, as on the order of 725-850 microns. Other embodiments may employ a stackup 400 having more or fewer layers, or layers made from different materials, and so the discussion of FIGS. 4A-4C is intended as an example and not any requirement.

A portion of the SOI layer 405 may be mechanically or chemically removed, for example by etching, grinding, polishing, vaporizing, and so on. The stackup 400 is illustrated in FIG. 4B with the SOI layer 405 having undergone this processing. Removing the portion of the SOI layer 405 forms the stair-step profile of the hanging connector 140 illustrated in FIGS. 1 and 2. The part of the stackup where no material was removed is effectively the base section 210 of the hanging connector 140, while the thinned part of the stackup 400 is the extended section 215; the BOX layer 405 therefore forms an external surface of the extended section. Both the base section 210 and extended section 215 are discussed in more detail above, with respect to FIG. 2.

In some embodiments the SOI layer 405 is three to five microns thick, and so the distance between the substrate 110 and the extended section 215 is three to five microns, insofar as this distance equals the thickness of the SOI layer. Accordingly, it should be appreciated that the extended section may be relatively close to the surface of the substrate 110 to which the base section is bonded.

FIG. 4C shows the stackup 400 inverted and with the FAC 120 attached to the BOX layer 410, functioning as a hanging connector. The BOX layer is bonded to the FAC 120, for example by a eutectic bond as discussed earlier. Generally, bonding the FAC 120 to the BOX layer 410 that forms the external surface of the extended section is highly precise and the amount of material removed (including, in some cases, a portion of the BOX layer) may be finely controlled through chemical or mechanical removal. Further, the exposed portion of the BOX layer 410 is clean and defect-free following the removal process, providing an excellent surface for bonding to the FAC 120. Just as the BOX layer forms a surface of the hanging connector that is bonded to the FAC 120, so does the SOI layer 405 form a surface of the hanging connector that is bonded to the connector surface of the substrate, as described above.

As discussed above with respect to FIGS. 1 and 2, a vertex of the FAC 120 is substantially coplanar with an emitter of the PIC 110, once the FAC 120 is affixed to the hanging connector 140 and the hanging connector affixed to the PIC 110. Generally, this alignment may be finely controlled because the three variables in the alignment are finely controlled. First, the amount of material removed from the stackup 400 may be precisely controlled and the exposed surface of the stackup 400 to which the FAC 120 is bonded is generally free of any surface defects. Second, an overall thickness of the stackup 400 (and thus the hanging connector 140) is dictated by wafer tolerances achievable when forming the stackup 400, for example through depositing or growing the various layers 405, 410, 415. Finally, eutectic bonds, such as those used to affix the hanging connector 140 to the FAC 120 and the PIC 110, are dimensionally controllable and repeatable with a high degree of precision. The combined variances of these three sources of potential misalignment may be as little as one to two microns, and are typically anywhere from three to five microns. This is well within the alignment tolerance of the FAC and the emitter for many photonics packages.

Figure 5:
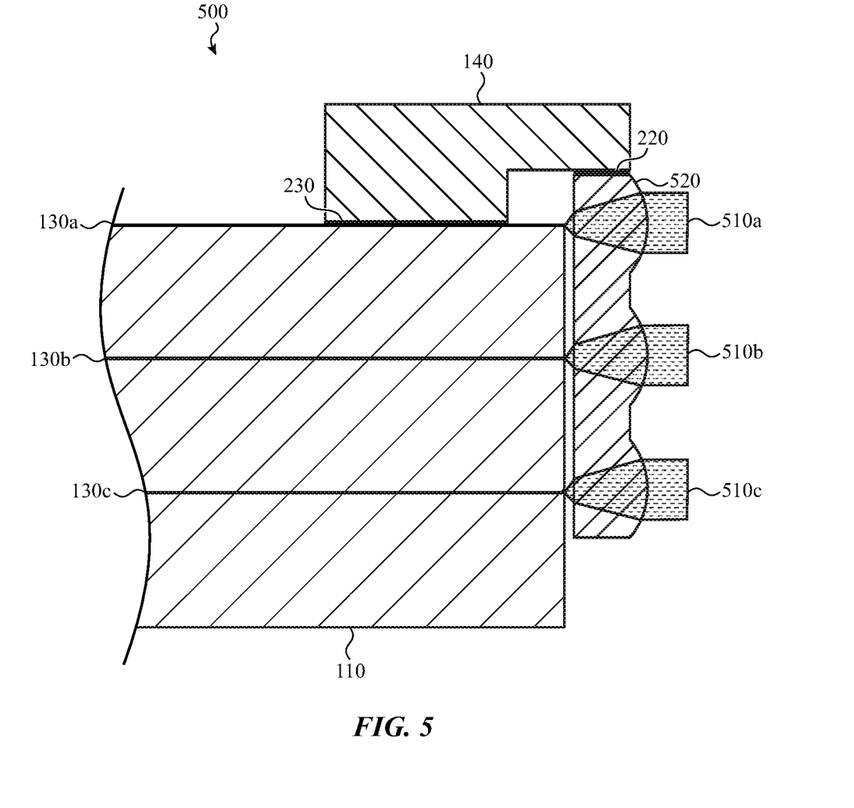
FIG. 5 is a cross-sectional view of a portion of a photonics package similar to that of FIG. 2, and illustrating a multi-tiered FAC.

FIG. 5 illustrates a photonics package 500 incorporating a multi-tiered FAC 520. Generally and as described with respect to prior figures, the multi-tiered FAC 520 is affixed to the hanging connector 140 by a first bond 220 and the hanging connector, in turn, is affixed to the PIC 110 by a second bond 230. The first and second bonds 220, 230 may be eutectic bonds, again as described above.

Unlike prior embodiments, multiple waveguides 130a, 130b, 130c extend through the PIC 110; additionally, waveguide 130a is shown at or near the connector surface of the PIC 110. Each waveguide 130a, 130b, 130c propagates a light output 510a, 510b, 510c from a light source to a separate vertex of the multi-tiered FAC 520, which collimates the respective light output. As shown in FIG. 5, the waveguides 130a, 130b, 130c are positioned at different distances from the connector surface of the PIC 110, where the connector surface is the surface to which the hanging connector 140 is affixed. The multi-tiered FAC 520 extends along (and is parallel to) a portion of the emitter surface of the PIC 110, such that each of its vertices is coplanar with a unique waveguide. In this manner, a single hanging connector 140 may support a FAC (or set of FACs) configured to collimate light outputs from multiple waveguides.

The multi-tiered FAC 520 of FIG. 5 may be formed as a single, unitary element that defines each of the vertices or may be formed from multiple FACs that are affixed to one another. In embodiments where the multi-tiered FAC 520 is formed from individual, affixed components, eutectic bonds may be used to attach each FAC to another. Additionally, each vertex of the multi-tiered FAC may be aligned along an axis parallel to the emitter surface of the PIC 110. Alternatively, one or more of the individual vertices (or FACs) may be off-axis, with respect to such an axis. Further, the multi-tiered FAC 520 may be a two-dimensional array of N×M FACs and is not limited to a 1×M configuration. This may be implemented where waveguides 130 form a grid.

Although FIG. 5 shows each FAC of the multi-tiered FAC 520 as the same cross-sectional size, there is no requirement that they are. Embodiments may have individual FACs that are more or less concave, or that extend further along the emitter surface of the PIC 110. This may be useful where the waveguides 130a, 130b, 130c propagate light of different wavelengths or that have other, different properties.

Figure 6A:
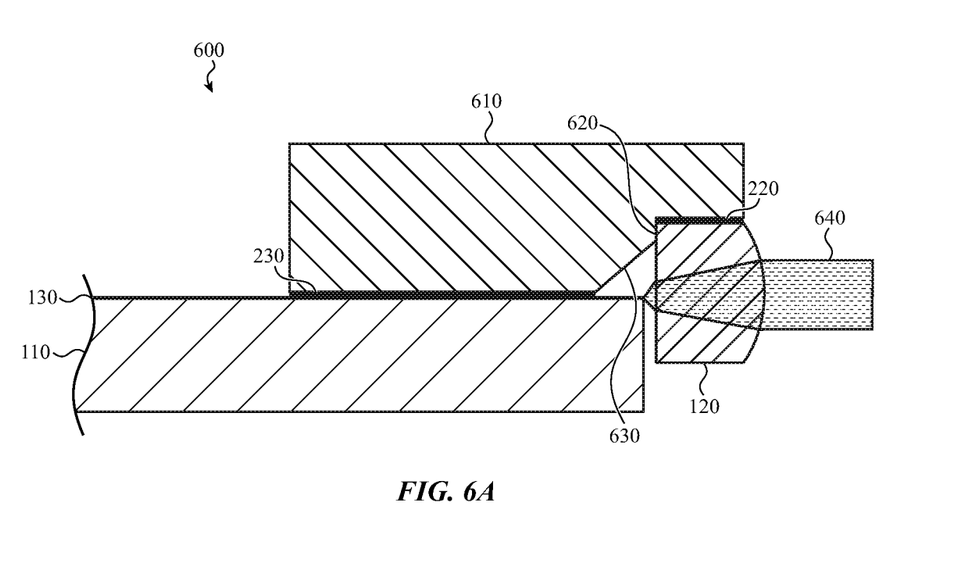
FIG. 6A is a cross-sectional view of a portion of a photonics package similar to that of FIG. 2, showing another example hanging connector.

FIG. 6A illustrates a photonics package 600' similar to the photonics package 100 shown in FIG. 1 but with a different hanging connector 610. Accordingly, like-numbered elements shown in FIG. 6A generally operate and/or are configured as described with respect to those same elements in FIG. 1 and will not be discussed further.

The hanging connector 610 includes a backstop 620 and angled sidewall 630. The backstop 620 abuts (e.g., touches) a side of the FAC 120 nearest the emitter surface of the PIC 110. The angled sidewall extends from the surface of the hanging connector 610 affixed to the PIC 110 by the bond 230. The backstop 620 thus may orient the FAC 120 with respect to the emitter surface. That is, the backstop may align the FAC 120 with respect to the emitter surface, ensuring the two are parallel. Further, the combination of the backstop and angled sidewall set the size of the offset 260, just as the extended section aligns the FAC 120 with the waveguide 130 (or an associated emitter). The angled sidewall 630 may be replaced with a stair-stepped structure in some embodiments.

The backstop 620 and angled sidewall 630 may be formed as part of the process for forming a stackup into a hanging connector, as generally detailed with respect to FIGS. 4A-4C. The backstop 620 and angled sidewall 630 may be formed through any suitable operation, including chemical etching, mechanical grinding or polishing, laser vaporization, and so on.

Figure 6B:
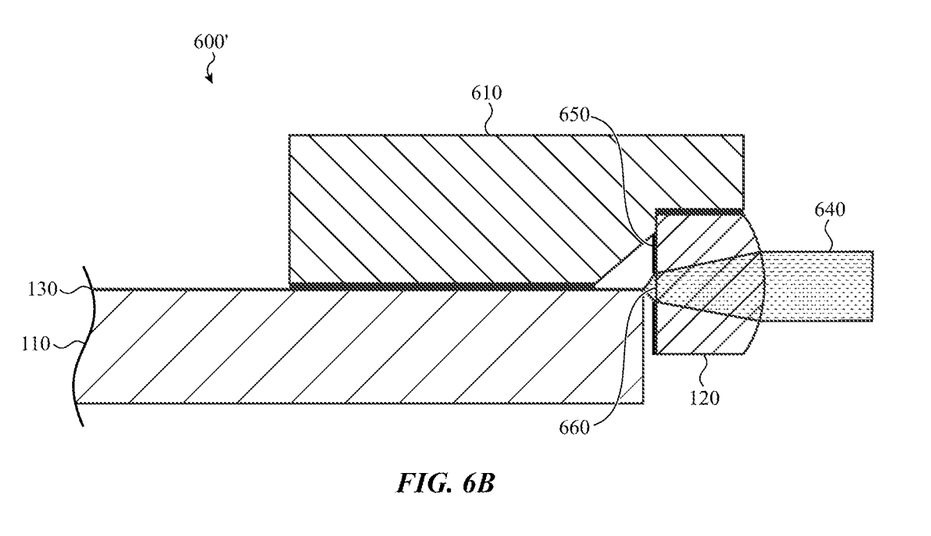
FIG. 6B is a cross-sectional view of a portion of a photonics package similar to that of FIG. 6A, but in which a coating has been applied to a FAC in order to define an aperture through which light passes.

FIG. 6B illustrates a photonics package 600 of FIG. 6A, but one in which the FAC 120 has a coating 650 applied to a surface of the FAC nearest the substrate 110. The coating 650 defines an aperture 660; the aperture 660 is essentially a portion of the FAC surface to which no coating is applied. Light 640 passes through the aperture 660 but not the coating 650; the coating may instead reflect, scatter, or absorb light. The aperture 660 and coating 650 help ensure that light 640 exiting the FAC 120 is properly aligned for reception by later optical components or other elements.

Figure 7:
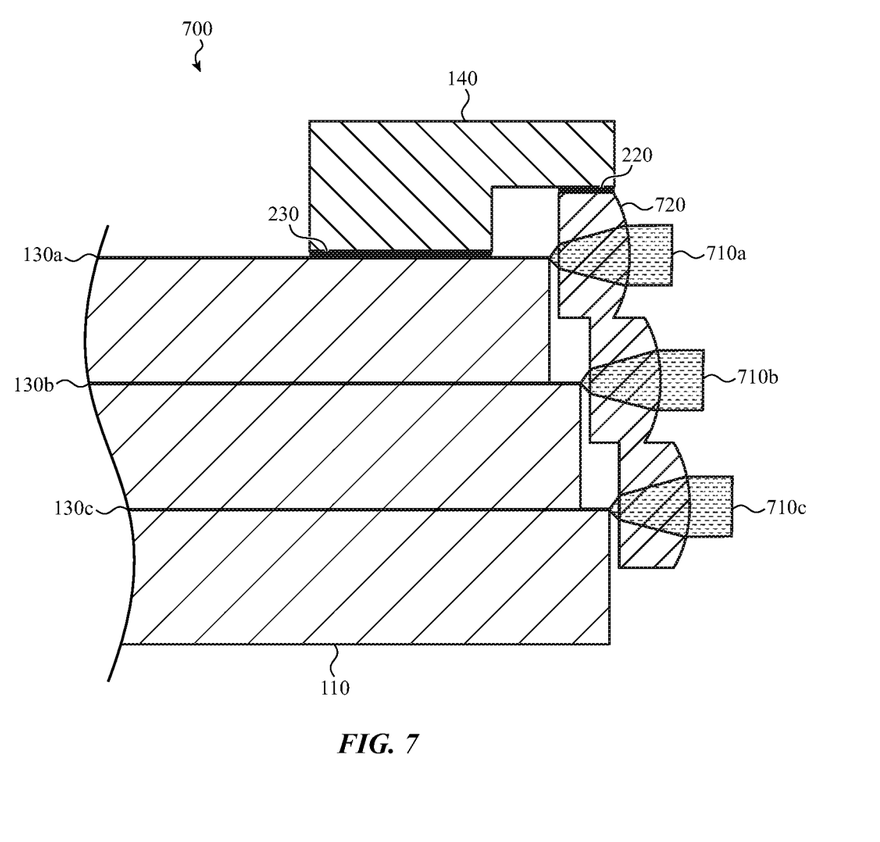
FIG. 7 is a cross-sectional view of a portion of a photonics package similar to that of FIG. 2, and illustrating another multi-tiered FAC.

FIG. 7 illustrates a hanging connector 140 affixed to a substrate 110 by a first bond 230 and to a multi-tiered FAC 720 by a second bond 220, similar to the embodiment of FIG. 5. In this embodiment 700, the substrate 110 has a stepped emitter edge, effectively defining multiple "layers" of the substrate 110, each with its own waveguide 130a, 130b, 130c. Each of these layers may extend further than the layer "above" it (e.g., the layer closer to the hanging connector 140). Thus, the layer closes to (and affixed to) the hanging connector 140 extends less than the layer below it, which extends less than the layer below that, and so on. This forms the stair-step emitter edge shown in FIG. 7.

The multi-tiered FAC 720 may be stepped along an edge closest to the emitter edge of the substrate 110. Generally, the step pattern of the multi-tiered FAC 720 matches the step pattern of the emitter edge, such that the gap between any single FAC of the multi-tiered FAC and its corresponding emitter (and/or portion of the emitter edge) is identical. Thus, the multi-tiered FAC 720 may accept and collimate light 710a, 710b, 710c from multiple waveguides 130a, 130b, 130c. As with the embodiment of FIG. 5, the multi-tiered FAC 720 may be formed as a single, unitary element or may be formed from multiple FACs that are affixed to one another.

Figure 8A:
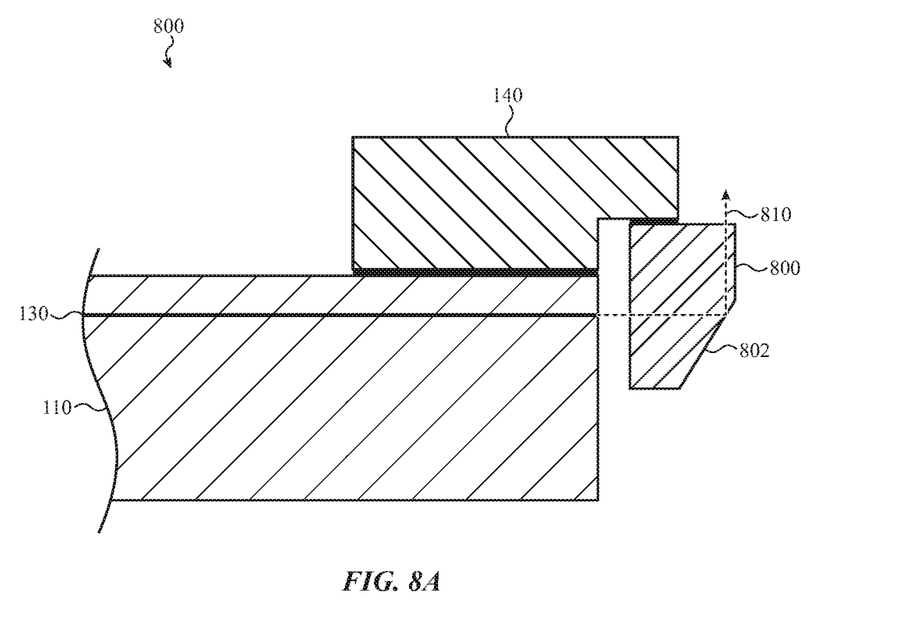
FIG. 8A is a cross-sectional view of a portion of a photonics package similar to that of FIG. 2, and illustrating a prism attached to a hanging connector.

FIG. 8A illustrates another example optical element 800 attached to a substrate 110 by a hanging connector 140. Here, however, the optical element 800 is a prism rather than a FAC. The prism 800 may redirect light 810 exiting the substrate 110 (or a waveguide 130 on the substrate) so that the light is emitted in a vertical, rather than horizontal, direction. Essentially, the angled edge 802 of the prism 800 functions as a reflector to redirect light. As with other embodiments, the hanging connector 140 is affixed to the substrate 110 via an adhesive, solder, or the like.

Figure 8B:
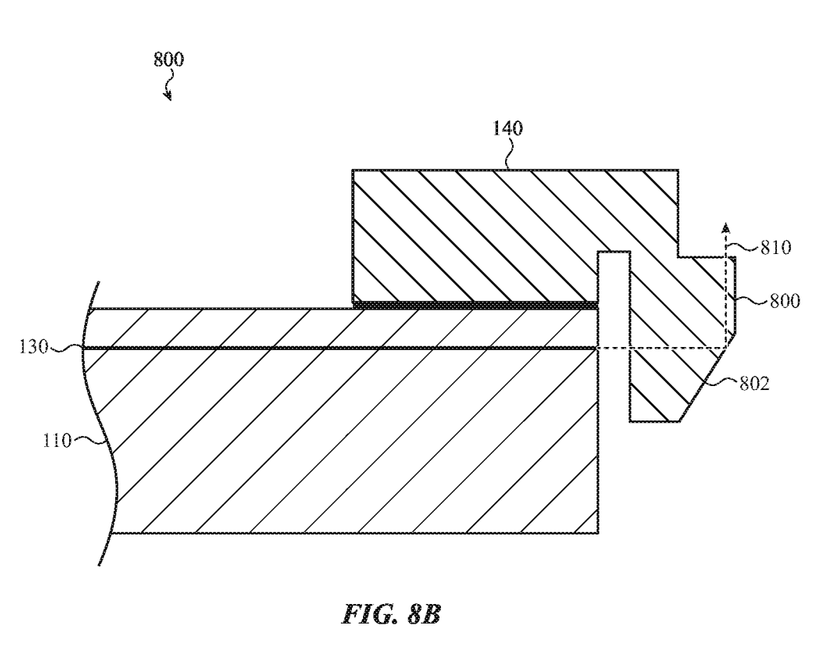
FIG. 8B is a cross-sectional view of a portion of a photonics package similar to that of FIG. 8A, in which the prism and hanging connector are unitary.

FIG. 8B shows an alternative to FIG. 8A. Here, the prism 800 is itself the hanging connector. Put another way, the prism 800 body is shaped to position the reflected, angled edge or facet 802 over an edge of the substrate 110 in order to reflect light 810 as described with respect to FIG. 8A. Thus, the embodiment omits a separate hanging connector entirely and uses a unitary element as both connector and prism.

Figure 9:
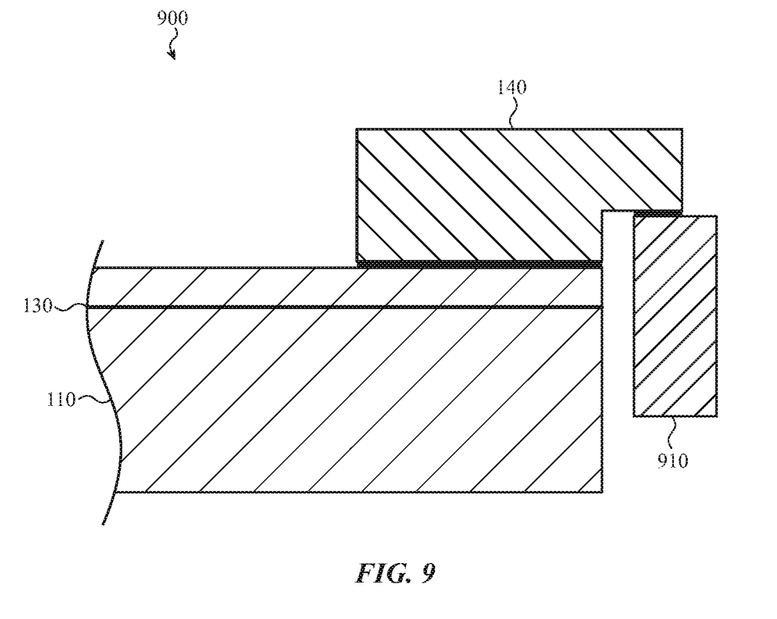
FIG. 9 is a cross-sectional view of a portion of a photonics package similar to that of FIG. 2, in which a photonics component (here, a photodetector) has replaced the FAC.

FIG. 9 shows yet another variant 900 in which a photodetector 910 replaces a FAC. Thus, it can be seen that the hanging connector 140 may position and/or attach any suitable component to a substrate 110 and not just an optical element such as a FAC or prism, and such components may receive light from a waveguide 130 of the embodiment. The remaining elements of the embodiment 900 are substantially identical to those illustrated in prior figures, such as FIG. 2.

Although the embodiments of FIGS. 8A-9 show a waveguide 130 within the substrate 110, for example beneath a cladding layer that may be part of the substrate, it should be understood that the waveguide(s) 130 may extend along a top surface of a respective substrate 110, or be positioned within a channel defined in such a surface. Either waveguide option (e.g., embedded within a substrate or beneath a cladding layer of a substrate, or extending along a surface of a substrate) may be used in any embodiment described herein with respect to any figure.

Hanging connectors, as described herein, may be manufactured through a variety of methods. As non-limiting examples, a silicon substrate may be diced with a blade or laser to form multiple tabs accurately from a single substrate. A series of kiss cuts (e.g., cuts that do not extend through an entirety of the substrate) may define the bodies of the hanging connectors, each of which remain attached to a common substrate and separated from one another by the remnants left after the kiss cut process. That is, the substrate is formed into an alternating series of bodies and remnants after the first cutting operation, where a remnant connects two bodies to one another. The bodies may be separated from one another with a second cut (again, made by a blade, laser, or the like); the series of second cuts generally passes through one end of each of the remnants, leaving one body attached to a single remnant. The remnant thus forms the portion of the hanging connector to which the FAC, optical element, or other component is attached by the first bond 220 (as shown in FIG. 2) while the body forms the portion of the FAC 120 attached to a substrate 110 by the second bond 230 (again, as shown in FIG. 2). In some embodiments the remnant may be attached to the substrate and the body to the FAC or the like.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A photonics package comprising:
a photonic integrated circuit comprising:
a connector surface;
an emitter surface; and
a plurality of waveguides positioned at different distances from the connector surface;
a hanging connector affixed to the connector surface; and
a multi-tiered fast-axis collimator (FAC) affixed to the hanging connector, wherein the multi-tiered FAC is positioned along the emitter surface and is configured to collimate light emitted from each of the plurality of waveguides.

2. The photonics package of claim 1, wherein:
the emitter surface is a stepped emitter surface.

3. The photonics package of claim 2, wherein:
the multi-tiered FAC comprises a stepped plurality of FACs; and
the stepped plurality of FACs are positioned relative to the plurality of waveguides such that there is a common gap between each of the stepped plurality of FACs and a corresponding waveguide of the plurality of waveguides.

4. The photonics package of claim 3, wherein:
the multi-tiered FAC is formed as unitary element.

5. The photonics package of claim 1, wherein the hanging connector comprises:
a base layer;
a top layer; and
a first layer positioned at least partially between the base layer and the top layer.

6. The photonics package of claim 5, wherein:
the base layer is a silicon substrate;
the first layer is a buried oxide layer; and
the top layer is a silicon-on-insulator layer.

7. The photonics package of claim 5, wherein:
the hanging connector is affixed to the connector surface with a bond between a surface of the top layer and the connector surface.

8. The photonics package of claim 7, wherein the bond is a eutectic bond.

9. The photonics package of claim 1, wherein a portion of the hanging connector extends into a recess defined in the connector surface.

10. The photonics package of claim 9, wherein the portion of the hanging connector extending into the recess is bonded to the substrate with a eutectic bond.

11. The photonics package of claim 1, wherein:
the multi-tired FAC defines a set of vertices; and
each of the set of vertices is coplanar with one of the plurality of waveguides.

12. A photonics package comprising:
a photonic integrated circuit comprising:
a connector surface;
an emitter surface; and
a plurality of emitters positioned at different distances from the connector surface;
a hanging connector affixed to the connector surface; and
a multi-tiered fast-axis collimator (FAC) affixed to the hanging connector, wherein:
the multi-tiered fast axis collimator defines a set of vertices; and
each of the set of vertices is coplanar with an emitter of the plurality of emitters to collimate a light output emitted by the emitter.

13. The photonics package of claim 12, wherein:
the plurality of emitters is positioned along a stepped emitter surface.

14. The photonics package of claim 13, wherein:
the multi-tiered FAC comprises a stepped plurality of FACs.

15. The photonics package of claim 12, wherein:
the multi-tiered FAC is formed as unitary element.

16. The photonics package of claim 12, wherein the hanging connector comprises:
a base layer;
a top layer; and
a first layer positioned at least partially between the base layer and the top layer.

17. The photonics package of claim 16, wherein:
the base layer is a silicon substrate;
the first layer is a buried oxide layer; and
the top layer is a silicon-on-insulator layer.

18. The photonics package of claim 16, wherein:
the hanging connector is affixed to the connector surface with a bond between a surface of the top layer and the connector surface.

19. The photonics package of claim 18, wherein the bond is a eutectic bond.

20. The photonics package of claim 12, wherein a portion of the hanging connector extends into a recess defined in the connector surface.

* * * * *